United States Patent [19]

Violland et al.

[11] 4,110,284

[45] Aug. 29, 1978

[54] POLYURETHANE LATEXES FROM SULFONATE PREPOLYMER, AQUEOUS CHAIN EXTENSION PROCESS, AND COATED SUPPORT

[75] Inventors: Robert Violland; Jean Neel, both of Lyons, France

[73] Assignee: Rhone-Progil, Courbevoie, France

[21] Appl. No.: 514,151

[22] Filed: Oct. 11, 1974

[30] Foreign Application Priority Data

Oct. 12, 1973 [FR] France ................... 73 37140

[51] Int. Cl.$^2$ ................... C08L 75/08; C08G 71/02
[52] U.S. Cl. ................... 260/29.2 TN; 528/273; 528/295; 528/83; 528/77; 528/76; 528/79; 528/75
[58] Field of Search ............... 260/29.2 TN, 77.5 AP, 260/75 S

[56] References Cited

U.S. PATENT DOCUMENTS

| | | | |
|---|---|---|---|
| 3,479,310 | 11/1969 | Dieterich et al. | 260/77.5 AP |
| 3,617,352 | 11/1971 | Shima et al. | 260/29.2 TN |
| 3,734,874 | 5/1973 | Kibler et al. | 260/75 S |
| 3,736,216 | 5/1973 | Hermann et al. | 260/29.2 TN |
| 3,759,873 | 9/1973 | Hudak | 260/29.2 TN |
| 3,879,450 | 4/1975 | Velker et al. | 260/29.2 TN |

FOREIGN PATENT DOCUMENTS

1,128,568  9/1968  United Kingdom.

*Primary Examiner*—Murray Tillman
*Assistant Examiner*—A. H. Koeckert
*Attorney, Agent, or Firm*—Bacon & Thomas

[57] ABSTRACT

Process of preparing anionic polyurethane latexes without the addition of a foreign emulsifying surface active agent comprising rendering the basic polyester or polyether constituent of the latex intrinsically emulsifiable or dispersible in water by incorporating an anionic functional group in the chain thereof and reacting this basic constituent with a diisocyanate in order to obtain a prepolymer which is then emulsified in water.

The latexes obtained are advantageously applied in coating impregnation processes, finishing of leather, and as binders for nonwoven fabrics.

14 Claims, No Drawings

POLYURETHANE LATEXES FROM SULFONATE PREPOLYMER, AQUEOUS CHAIN EXTENSION PROCESS, AND COATED SUPPORT

BACKGROUND OF THE INVENTION

The present invention relates to a process for the preparation of anionic polyurethane latexes without the necessity of incorporating emulsifying surface active agents therein, as well as to the latexes obtained and their applications.

The development of polyurethane elastomers satisfactory for use as film-forming agents has been extremely difficult, since it was necessary to apply the elastomers in solution form in a solvent which was both costly and toxic, i.e., dimethylformamide. This has prompted numerous attempts in the art to prepare polyurethane elastomers in latex form.

In general, these latexes differ from vinyl and acrylic type latexes in that the emulsive part thereof which determines their stability must be an integral part of the molecule and, hence, cannot comprise an emulsive substance foreign to the polymer.

The usual method of obtaining such latexes consists in preparing, in the absence of water, a polyurethane prepolymer normally insoluble in water, with or without isocyanate end groups of relatively low molecular weight, so that it remains sufficiently fluid to be emulsified. In order for such a product to possess film-forming properties, it is further necessary to increase its molecular weight.

In the case of cationic latexes, the incorporation of the ionic group in the macromolecular chain does not present a difficult problem. A certain amount of an aminodialcohol soluble in the polyether or polyester which is the basic constituent of polyurethane is incorporated during the fabrication of the prepolymer; this aminoalcohol can therefore readily react with the diisocyanate.

The problem becomes more complex, however, when it is desired to prepare an anionic latex. In order to incorporate the ionic group during the fabrication of the prepolymer, it would be necessary to provide a bifunctional compound with a sodium sulfonate function soluble in the basic polyester or polyether component which is virtually impossible in practice.

Various processes for preparing anionic polyurethane latexes have been proposed. Thus, French Pat. No. 1,499,121 granted Dec. 8, 1965, proposes the preparation of a prepolymer emulsion without a foreign ionic surface active agent, the latter being introduced during mixing with water and becoming attached to the prepolymer during the chain propagation reaction.

French Pat. No. 1,580,014, Sept. 18, 1968, uses, as anionic constituents, lysine in the form of its alkaline salts, which also function as chain propagation agents by reaction with a prepolymer, and thus leading to high molecular weight polyurethanes. The foregoing lysine salts are used in such proportions that after the reaction with the polymer, the final polyurethane contains in its dry extract between 0.05 and 1% by weight of COO$^-$ groups.

Finally, French Patent Application No. 2,014,990, Apr. 24, 1970, uses presulfonation with sulfuric acid or a sulfonic acid, either of the diisocyanate, or of the prepolymer, the sulfonated prepolymer being then reacted with a base and mixed with an aqueous medium in which it undergoes chain propagation to form a polyurethane in latex form. In addition to the fact that acceptable reproducibility of the sulfonation reaction is difficult to achieve, this process does not seem to lead to homogeneous latexes with sufficiently small particles to provide for a suitable service life and film-forming properties.

Thus, each of these prior art processes, although of technical interest, nevertheless involve attendant difficulties in practice with respect to maintaining the level in the prepolymer or, in those processes wherein the emulsifying group is incorporated in an aqueous medium, there is a substantial risk that the reaction increasing the molecular weight will prevail over the desired reaction incorporating the emulsifying group in the prepolymer. Therefore, there exists a need for a simple process for the incorporation of the ionic group in the prepolymer chain to afford an emulsifiable polyurethane which will form the desired latex in water.

SUMMARY OF THE INVENTION

It is, therefore, a primary object of the present invention to provide a process for preparing anionic polyurethane latexes which obviates the difficulties and disadvantages of heretofore known processes.

A further object of the instant invention is to prepare an emulsifiable polyurethane prepolymer derived from a polyether or polyester having anionic functional groups in the chain thereof and which hydrophilic polyester or polyether is reacted with an organic polyisocyanate.

Another object of the present invention is to prepare a polyurethane latex from a polyurethane which is intrinsically emulsifiable due to presence of anionic hydrophilic groups in the polymer and to obtain such a latex which is film-forming and suitable for use in coating and impregnation processes, leather finishing and as binder for nonwoven fabrics without employing any external emulsifying agent or dispersion aid.

These and other objects and advantages of the invention will be apparent from the detailed description of the invention which follows.

DETAILED DESCRIPTION OF THE INVENTION

The present invention relates to a process of preparing anionic polyurethane latexes without the incorporation of a foreign emulsifying surface active agent, essentially comprised of rendering the basic polyester or polyether constituent inherently emulsifiable in water due to the presence of at least one anionic group in the structure of such constituent, reacting the latter with an organic isocyanate to obtain a prepolymer advantageously having a molecular weight ranging from about 2000 to 10,000, with terminal —NCO groups, and subsequently emulsifying the prepolymer in water, thus causing the formation of a polyurethane polymer latex of relatively high molecular weight.

From a theoretical standpoint, the process of the invention is particularly attractive in the sense that the introduction of a hydrophilic sulfur containing group in the prepolymer is achieved through anionic reactions devoid of undesirable side reactions. In practice, this results in the formation of highly dispersed and stable latexes whose preparation does not require any appreciable expenditure of mechanical energy, a simple mixing of the prepolymer and water being sufficient.

The polyester or polyether utilized as the basic component is not critical, but should be such that it is highly compatible with the substances that will be added to it in subsequent steps. The molecular weight of the foregoing ranges from about 1000 to 4000, and it, therefore, constitutes a major proportion by weight of the prepolymer and final polyurethane.

The preparation of the basic constituent may be accomplished by any known reaction, such as polycondensation or polyaddition of a low molecular weight bifunctional molecule provided with one or more anionic groups.

For example, a polyester may be prepared from a diacid or its diester, from a glycol and a sulfonated diacid, its sulfonated diester, or the alkaline salt thereof.

As diacids, there may be utilized, unsaturated and saturated diacids, such as maleic, fumaric, phthalic, isophthalic, terephthalic, succinic, sebacid, suberic, etc., and the methyl, ethyl, propyl, and butyl diesters of these acids. Glycols and diols, such as ethylene glycol, diethylene glycol, propylene glycol, dipropylene glycol, butanediol, hexanediol, neopentyl glycol, cyclohexanediol, dicyclohexanediol propane, and the like are suitable polyester forming reactants.

As low molecular weight bifunctional molecules containing an anionic group, sulfonated diacids, such as isosulfophthalic acid, sulfosuccinic acid, and the methyl, ethyl, propyl, and butyl diesters of these acids or their alkaline salts may be employed.

Polyethers can be prepared by condensing an alkylene oxide with one of the bifunctional molecules having an anionic group thereon as defined above or by condensing an alkylene oxide with a polyhydric alcohol and the aforesaid anionic bifunctional compounds. Exemplary oxides include ethylene oxide, propylene oxide, butylene oxide and the like. Suitable polyhydric alcohols are the glycols, glycerine, pentaerythritol, sorbitol, hexanetriol, trimethylol propane and the like. Mixtures of the foregoing oxides may also be employed and suitable polyethers may be derived from secondary hydroxyl compounds, such as, for example, polyhydric polyoxypropylenes prepared from propylene oxide and a trihydric alcohol or glycol like glycerine or ethylene glycol.

To prepare an anionic polyether, a sulfonated diester as defined above can be transesterified by using a polyether with end hydroxyl groups and having a molecular weight on the order of 1000 to 2000, the alkyl radical being selected so that the molecule to be transesterified is soluble in the polyether; the butyl radical, for example, is suitable for this purpose.

It is also possible to use a combination of the two types of basic constituents: polyester and polyether.

The proportion of low molecular weight bifunctional anionic molecule used in the polycondensation or polyaddition reaction, is dictated by the degree of anionic character desired in the final molecule. In general, the basic polyester or polyether constituent should contain from 0.5 to 3% by weight of sulfur, which necessitates the presence of two diacids, a sulfonated diacid and another nonsulfur-containing diacid. If the latter were not present, the percentage of sulfur in the polyester or polyether would be excessively high.

The anionic group modified polyester or polyether thus prepared is subsequently used in a second step for the preparation in an anhydrous medium of a polyurethane prepolymer having the following characteristics.

The molecular weight should be such that in the temperature range from 0° to 100° C., it remains sufficiently liquid to be agitated and then emulsified in water, without the aid of a solvent or with a minimum amount of solvent. The urethane group content must be such that the polymer obtained after emulsification has the characteristics required. In general, between 1 and 5% of nitrogen attributable to the urethane group or urea is introduced.

The anionic group content should render the prepolymer self-emulsifiable in water, preferably cold, with a polymer particle size such that there is an adequate rate of diffusion of water into the interior of the particles, as further explained below.

The anionic polyester or polyether constituent is the predominant component in the prepolymer. The remaining components of the prepolymer are produced conventionally used for the formation of polyurethanes:

Diisocyanates, such as: 2,4-toluene diisocyanate, 2,6-toluene, diisocyanate, 4,4'-diphenylmethane diisocyanate, hexamethylene diisocyanate, isophorone diisocyanate, diphenyl diisocyanate, naphthalene diisocyanate, meta-phenylene diisocyanate, paraphenylene diisocyanate, etc.

Likewise, diols or amines which act as chain extending agents to permit the adjustment of the urethane group or urea content in the prepolymer composition to the desired level may be included. Satisfactory compounds include, for example, dialcohols, such as ethylene glycol, diethylene glycol, neopentyl glycol, hexanediol, butanediol, etc., amines, such as ethanolamine, aminoethylethanolamine, etc., diamines such as ethylenediamine, propylenediamine, hexamethylenediamine, etc.

Optionally, tri- or polyfunctional substances may be utilized to produce a certain degree of reticulation in the prepolymer, such as trifunctional isocyanates, triols, tetrols, etc.

The prepolymer thus formed is then emulsified in water. The successful completion of the emulsification operation is important, since it determines both the stability of the latex obtained and the molecular weight of the final polyurethane.

The chain propagation reaction and increase in molecular weight resulting from the reaction of water with the -NCO groups of the prepolymer takes place in two stages; first the formation of amines and evolution of carbon dioxide, then the reaction of the amine formed with the remaining -NCO groups.

The molecular weight increase is substantially proportionate to the number of amine functions created in the first place which are consumed in the second phase and, consequently, the higher the proportion of amine functions consumed, the greater the increase in molecular weight.

Since a large amount of water is present, it is indispensable that the rate of diffusion of water inside the latex particles be controlled so that the reaction rate of the first phase is markedly slower than the reaction rate of the second phase. Consequently, in order to achieve this control, the latex particles must, as soon as emulsification occurs, have a definite size representing a compromise between two important considerations: the particles should be sufficiently large so that the reaction rate of the first phase is slow, and at the same time, sufficiently small so that the latex is stable during storage.

With respect to the foregoing, the present invention is particularly attractive since it permits the preparation of a prepolymer which is self-emulsifiable in water and whose content of hydrophilic groups can be regulated so as to obtain the desired particle size.

In accordance with the present invention, it is possible, if desired, to add various additives for regulating the pH, surface tension, and other characteristics of the aqueous polyurethane latex obtained.

Nonlimiting examples illustrating the invention are given below.

EXAMPLE 1

(a) Preparation of polyester

A reactor provided with a distillation column is charged with 1900 parts of diethylene glycol and 296 parts of sodium dimethyl sulfoisophthalate. The reactor is heated by a bath to 220° C. When the internal temperature of the reactor reaches 140° C., the medium becomes homogeneous. Then 2.4 parts of tetraisopropyl orthotitanate dissolved in 18.6 parts of diethylene glycol are added. The methanol produced by the reaction is distilled off, and during this operation the internal temperature rises spontaneously from 150° to 200° C. The latter temperature is maintained until at least 55 parts of methanol has been recovered.

The temperature of the reactor is reduced to 140° C. in order to allow the introduction of 2190 parts of adipic acid, and the water resulting from the reaction is distilled off. As this elimination takes place, the internal temperature changes from 140° to 200° C.

When the output of the distillation column becomes zero, it is reestablished by placing the apparatus under partial vacuum (760 to 30 mm Mg). When at least 98% of the theoretical amount of water has thus been distilled off, the pressure is reduced further in order to adjust the molecular weight to the desired value by distilling off diethylene glycol. The polyester obtained has an acid number of 0.14 mg KOH/g and a molecular weight of 1980.

An identical polyester is obtained by replacing the 296 parts of sodium dimethylsulfoisophthalate with 268 parts of sodium isophthalic acid 5-sulfonate in the first part of the reaction.

(b) Preparation of polyurethane latex

Into a reactor are introduced 740 parts of the polyester described above, 264 parts of a diethylene glycol polyadipate of molecular weight 2000, 47 parts of ethylene glycol, and 278.4 parts of toluene diisocyanate. The mixture is heated to 80° C. for 4 hours, and at the end of that period the amount of the isocyanate function present is 2.1%. The temperature is then lowered to 50° C., 440 parts of acetone are added, and the mixture is cooled to room temperature. The mixture is emulsified in 2000 parts of water and agitated for 4 hours at room temperature.

The acetone is separated from the latex obtained by vacuum distillation. The latex is perfectly stable during storage. The film obtained from this latex has the following properties:

| | |
|---|---|
| Rupture strength | 290 kg/cm$^2$ |
| Elongation at rupture | 1280% |
| Modulus at 100% | 14.3 kg/cm$^2$ |
| Swelling by weight: water 195° C. | 11.2% |
| trichloroethylene | 118% |
| methyl ethyl ketone | 66.4% |

EXAMPLE 2

(a) Preparation of polyether

A polyhydroxypropylene glycol having a molecular weight of 2000 is first prepared. To 4000 parts of the latter there is added a solution containing 380 parts of sodium dibutylsulfoisophthalate, 1000 parts of N-butanol, and 2.6 parts of tetraisopropyl orthotitanate. The reactor temperature is increased over approximately 4 hours to 200° C., with butanol being eliminated by distillation. The operation is concluded by heating for 5 hours at 200° C., the apparatus being under a vacuum of 0.5 to 1 mm. The polyether obtained is colorless, has a hydroxyl number of 26.3 and, in water, it yields a turbid solution.

(b) Preparation of polyurethane latex

Into a reactor are introduced 400 parts of polyether from Example 2a, 0.2 part of paratoluenesulfonic acid, and 161 parts of toluene diisocyanate. The mixture is heated for 2 hours at 70° C., and 29.1 parts of ethylene glycol are added. After 4 hours of heating at 70° C., the proportion of -NCO is 3.5%.

The temperature is lowered to 50° C., and 850 g of deionized water is added while stirring at a moderate rate. The latex must remain for at least 24 hours at room temperature. It is fluid and stable.

EXAMPLE 3

(a) Preparation of polyester

Into apparatus analogous to that of Example 1 are introduced 1930 parts of diethylene glycol, 248 parts of sodium dimethylsulfosuccinate, and 2190 parts of adipic acid. The reactor is heated to 140° C., and 2.4 parts of tetraisopropyl orthotitanate dissolved in 20 parts of diethylene glycol are added.

The water-methanol mixture from the reaction is distilled until the reactor temperature reaches 180° C. When the output of the distillation column becomes zero, it is reestablished by placing the apparatus under partial vacuum. When the acid number of the reactor contents reaches 9 mg of KOH per gram, a vacuum of 1 mm is established so as to distill off a sufficient amount of diethylene glycol to adjust the molecular weight of the polyester to 1200.

(b) Preparation of polyurethane latex

Using polyester 3a, the same operating procedure as that of Example 2 is followed with the weight of the reactants used being the same, with the exception of the glycol, which amount is reduced to 32 parts.

EXAMPLE 4

(a) Preparation of polyester

Into apparatus analogous to that of Example 1 are introduced 1600 parts of 1,4-butanediol, 248 parts of sodium dimethylsulfosuccinate, and 1629 parts of maleic anhydride. The reactor is heated to 150° C., at which temperature are added 2.4 parts of tetraisopropyl orthotitanate dissolved in 30 parts of butanediol. The reaction is continued as indicated in the previous examples. The polyester obtained has an acid number of 1.8 mg KOH per gram and a molecular weight of 1620.

(b) Preparation of polyurethane latex

Into a reactor are introduced 800 parts of the polyester described in 4a, 300 parts of a butanediol polyadipate of molecular weight 1800, and 14 parts of neopentyl glycol. The mixture is heated to 50° C., and 300 parts of diphenylmethane diisocyanate is introduced in fractions over a period of 1 hour. The temperature is maintained at 80° C. for 3 hours, at the end of which the latex has an isocyanate number of 2.1%.

The mixture is cooled to 50° C., 420 g of acetone are added, and after cooling to room temperature, emulsification is carried out by adding 2000 parts of water. After standing for 3 hours at room temperature, acetone is separated from the latex by vacuum distillation.

The anionic polyurethane latexes of the invention display interesting and valuable properties in various areas of application. Included among their possible fields of application are the coating and impregnation of fabrics, binding of unwoven fabrics, finishing of leather and, in general, those areas where it is necessary to impregnate a flexible support in some manner while retaining its flexibility and imparting to it an adequate wear resistance and a pleasant feel.

The above examples and disclosure are set forth merely for illustrating the mode and the manner of the invention and various modifications and embodiments can be made by those skilled in the art, in the light of the invention, without departing from the spirit of the invention.

What is claimed is:

1. A process for preparing an auto-emulsified, highly disperse, film-forming and storage stable anionic polyurethane latex comprising charging an auto-emulsified and water propagable isocyanato chain terminated, anionic polyurethane prepolymer into an aqueous medium, and thence agitating the resulting dispersion to auto-emulsify and chain propagate said prepolymer, said prepolymer having a molecular weight between about 2000 and 10,000 and being formed from the reaction of at least:
    (a) a member selected from the group consisting of an anionic sulfonated polyester, an anionic sulfonated polyether and admixtures thereof, having a molecular weight between about 1000 and 4000 and a sulfur content between about 0.5 and 3% by weight, wherein said polyester is prepared by condensing at least:
    (i) a dicarboxylic acid or its lower alkyl diester
    (ii) a polyol
    (iii) and a sulfonated diacid, its sulfonated diester or the alkali metal salt thereof, said diacid being selected from the group consisting of isosulfophthalic and sulfosuccinic acid, and wherein said polyether is prepared from a bifunctional molecule selected from the group consisting of a sulfonated diacid, its sulfonated diester or the alkali metal salt thereof, said diacid being selected from the group consisting of isosulfophthalic and sulfosuccinic acid;
    (b) with an amount of at least one diisocyanate sufficient to produce a prepolymer having only terminal isocyanate groups;
    (c) and, a chain extending agent.

2. The process as defined in claim 1, wherein said dicarboxylic acid is selected from the group consisting of adipic, maleic, fumaric, phthalic, isophthalic, terephthalic, succinic, sebacic and suberic and said polyol is selected from the group consisting of ethylene glycol, diethylene glycol, propylene glycol, dipropylene glycol, butanediol, hexanediol, neopentyl glycol, cyclohexanediol, and dicyclohexanediol propane.

3. The process as defined in claim 1, wherein said sulfonated, anionic polyether is obtained from the reaction of an alkylene oxide and said bifunctional molecule.

4. The process as defined in claim 1, wherein said sulfonated, anionic polyether is obtained from the reaction of an alkylene oxide with a polyhydric alcohol and said bifunctional molecule.

5. The process as defined in claim 4 wherein said alkylene oxide is selected from the group consisting of ethylene oxide, propylene oxide and butylene oxide and said polyhydric alcohol is selected from the group consisting of ethylene glycol, diethylene glycol, glycerine, pentaerythritol, sorbitol, hexanetriol and trimethylol propane.

6. The process as defined in claim 1, wherein the chain extending agent is a diol selected from the group consisting of ethylene glycol, diethylene glycol, neopentyl glycol, hexanediol, and butanediol, which is employed prior to contacting with water to regulate the urethane group content of said prepolymer.

7. The process as defined in claim 1, wherein the chain extending agent is an amine selected from the group consisting of ethanolamine, aminoethyl-ethanolamine, ethylenediamine, propylenediamine and hexamethylene diamine, which is employed prior to contacting with water to regulate the urea group content of said prepolymer.

8. The process as defined in claim 1 wherein a polyfunctional compound having a hydroxy or isocyanate functionality greater than two is employed to reticulate said prepolymer.

9. The anionic polyurethane aqueous latex prepared according to the process defined by claim 1.

10. The anionic polyurethane aqueous latex as defined by claim 9, wherein said anionic polyester has an acid number between about 0.14 mg KOH/g and 9 mg KOH/g.

11. The anionic polyurethane aqueous latex as defined by claim 9, wherein said prepolymer has an isocyanate content ranging between about 2.1% and 3.5%.

12. The anionic polyurethane aqueous latex as defined by claim 9, wherein said prepolymer has a urethane or urea nitrogen content ranging between about 1% and 5% based on the prepolymer molecular weight.

13. A flexible support having the anionic polyurethane aqueous latex as defined by claim 9 applied thereto.

14. The flexible support as defined by claim 13, wherein said polyurethane latex is applied in film form and said film has a rupture strength of at least 290 kg/cm$^2$, an elongation at rupture of at least 1280%, a modulus at 100% of at least 14.3 kg/cm$^2$.

* * * * *